(12) United States Patent
Watson

(10) Patent No.: US 7,740,276 B2
(45) Date of Patent: Jun. 22, 2010

(54) WINDOW RESTRAINT DEVICE

(76) Inventor: Jason Watson, 1915 Thomas Ave., Charlotte, NC (US) 28205

(*) Notice: Subject to any disclaimer, the term of this patent is extended or adjusted under 35 U.S.C. 154(b) by 974 days.

(21) Appl. No.: 11/403,215

(22) Filed: Apr. 12, 2006

(65) Prior Publication Data
US 2007/0240833 A1    Oct. 18, 2007

(51) Int. Cl.
*B60R 21/02*    (2006.01)
*E06B 3/32*    (2006.01)
(52) U.S. Cl. .................. 280/748; 280/749; 160/105
(58) Field of Classification Search .............. 280/748, 280/749; 160/105
See application file for complete search history.

(56) References Cited

U.S. PATENT DOCUMENTS

| | | | | |
|---|---|---|---|---|
| 4,653,562 A | * | 3/1987 | Moss et al. ............... | 160/105 |
| 5,098,149 A | * | 3/1992 | Lee .......................... | 296/97.6 |
| 5,133,585 A | * | 7/1992 | Hassan ..................... | 296/97.5 |
| 5,344,206 A | * | 9/1994 | Middleton ................ | 296/97.8 |
| D371,759 S | | 7/1996 | Larsen | |
| 5,860,466 A | * | 1/1999 | Kao ......................... | 160/370.22 |
| 6,079,474 A | * | 6/2000 | Lin .......................... | 160/370.22 |
| 6,227,600 B1 | * | 5/2001 | Chen ........................ | 296/97.2 |
| 6,648,396 B2 | * | 11/2003 | Monahan et al. ......... | 296/97.7 |
| 6,676,205 B2 | * | 1/2004 | Lin .......................... | 296/214 |
| 6,796,358 B1 | | 9/2004 | Moore | |
| 2001/0023745 A1 | | 9/2001 | Haid et al. | |
| 2005/0199357 A1 | * | 9/2005 | Dunn ....................... | 160/370.22 |

* cited by examiner

*Primary Examiner*—Toan C To
(74) *Attorney, Agent, or Firm*—Williams Mullen, PC; Thomas F. Bergert

(57) ABSTRACT

A window restraint device includes a mesh screen having an upper end and a lower end. The restraint device includes an upper attachment device, such as a clip or strap, coupled to the screen upper end for removable attachment to an automobile door frame. The restraint device also includes a lower attachment device, such as a suction cup, coupled to the screen lower end for connecting the lower end of the screen to an automobile window. Neither the upper or lower attachment devices interfere with normal operation of the vehicle window, nor do they restrict a pet from normal movement within the vehicle. The restraint device may also include a spring-loaded reel from which the screen may be extended from or retracted into. The spring provides tension between upper and lower ends of the screen.

20 Claims, 9 Drawing Sheets

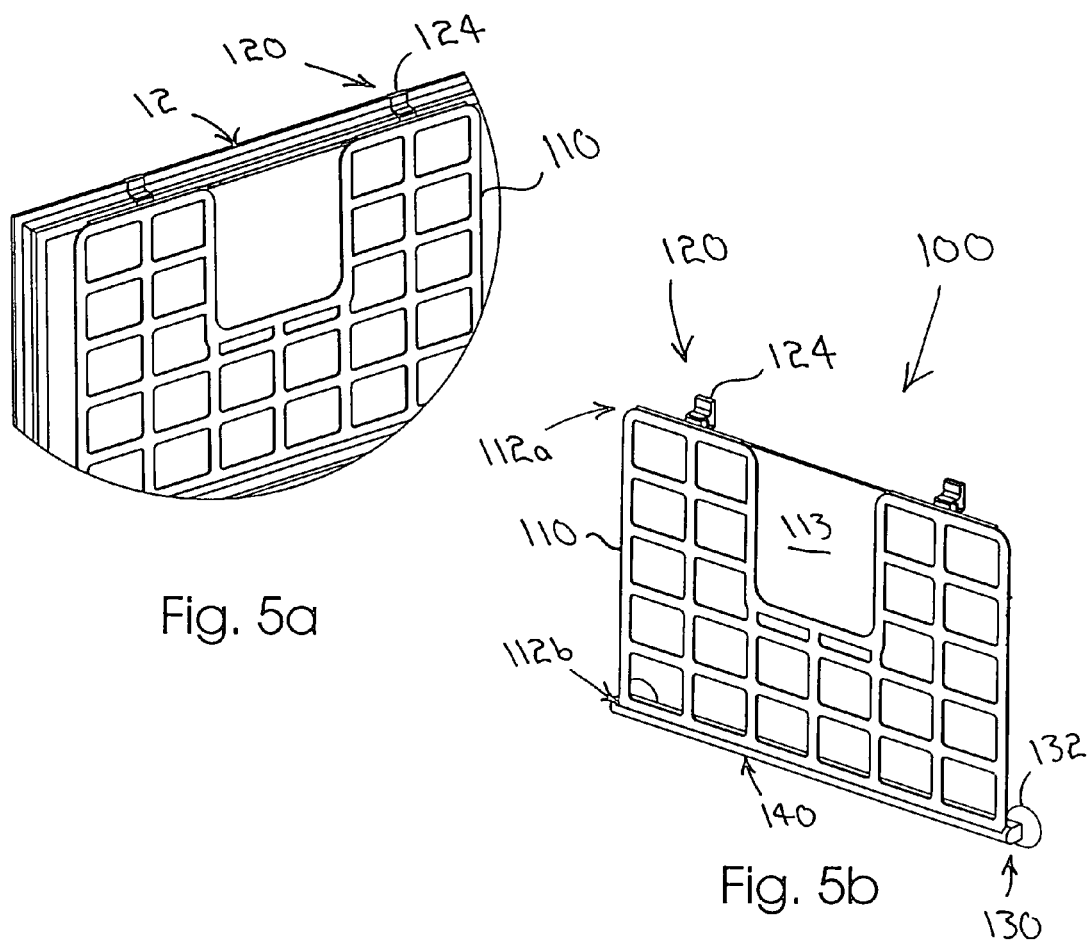
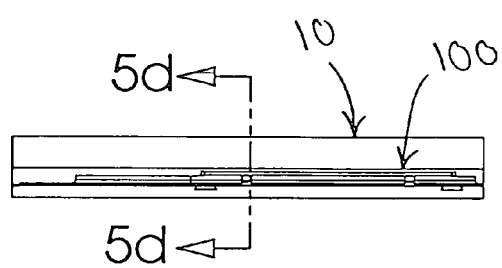
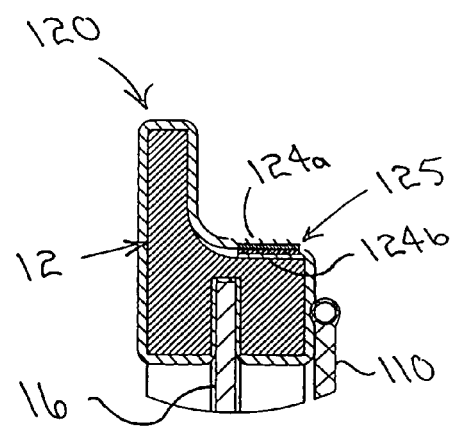

WINDOW RESTRAINT DEVICE

BACKGROUND OF THE INVENTION

This invention relates to window restraint devices and, more particularly, to a window restraint device for restraining pets within a vehicle that installs to the frame of a vehicle door and window while still allowing the window to be selectively opened and closed and without restricting the pet's movement.

Dog owners frequently take their pet, such as a dog, along during car trips and, in fact, prefer to allow their dog to move freely about the vehicle's interior space. Allowing the dog to be unrestrained during vehicle travel, however, can be dangerous in that the dog may be thrown about or even out of an open window if the vehicle is involved in a traffic accident or during a fast or sharp turn.

Various devices have been proposed in the art for restraining a dog within a vehicle. Although assumably effective for their intended purposes, the existing devices and product proposals completely restrain the pet from moving about the vehicle or are mounted to the vehicle car door in a manner that prevents the vehicle window from being selectively opened or closed.

Therefore, it would be desirable to have a window restraint device that keeps a dog from accidentally falling out or being thrown out of a vehicle window. Further, it would be desirable to have a window restraint device that enables a dog to move freely about the interior space of a vehicle. In addition, it would be desirable to have a dog restraint device that does not interfere with normal raising and lowering of a vehicle window.

SUMMARY OF THE INVENTION

Accordingly, a window restraint device according to the present invention includes a mesh screen having an upper end operatively connected to an upper attachment device for being selectively attached to an upper portion of a vehicle door frame and a lower end operatively connected to a lower attachment device for being selectively attached to a vehicle window. The lower attachment device is preferably a suction device while the upper attachment device is preferably a clip or a strap.

In addition, the window restraint device includes a height adjustment reel for maintaining a predetermined tension between upper and lower screen ends. When the suction device is coupled to a vehicle window and the upper restraint device is connected to the upper portion of the vehicle door frame, the window itself may be operated freely and without interference. The screen is able to extend from or be retracted into the reel as the window is lowered or raised. The reel may be spring-loaded so as to maintain a tension between upper and lower ends of the mesh screen. The window restraint device may also include a remotely operated release mechanism.

Therefore, a general object of this invention is to provide a window restraint device for restraining a pet from falling or being thrown out of a vehicle window.

Another object of this invention is to provide a window restraint device, as aforesaid, which allows a pet to move freely about a vehicle interior area.

Still another object of this invention is to provide a window restraint device, as aforesaid, having a mesh screen that provides air flow therethrough.

Still another object of this invention is to provide a window restraint device, as aforesaid, which does not interfere with the raising or lowering of a vehicle window to which it is attached.

Yet another object of this invention is to provide a window restraint device, as aforesaid, having a spring-loaded reel from which the screen may be extended or into which it may be retracted.

A further object of this invention is to provide a window restraint device, as aforesaid, in which extension or retraction of the screen may be remotely actuated.

A still further object of this invention is to provide a window restraint device, as aforesaid, that is easy to install and inexpensive to manufacture.

Other objects and advantages of the present invention will become apparent from the following description taken in connection with the accompanying drawings, wherein is set forth by way of illustration and example, an embodiment of this invention.

BRIEF DESCRIPTION OF THE DRAWINGS

FIG. 2b is a top view of the height adjustment reel as in FIG. 2a;

FIG. 5a is a fragmentary view of the restraint device attached to a vehicle door frame with straps;

FIG. 5b is a perspective view of the restraint device as in FIG. 5a removed from the vehicle door frame;

FIG. 5c is a top view of the restraint device as in FIG. 5b;

FIG. 5d is a sectional view of the restraint device taken along line 5d-5d of FIG. 5c;

FIG. 7b is a top view of the restraint device as in FIG. 7a;

DESCRIPTION OF THE PREFERRED EMBODIMENT

Figure 1:
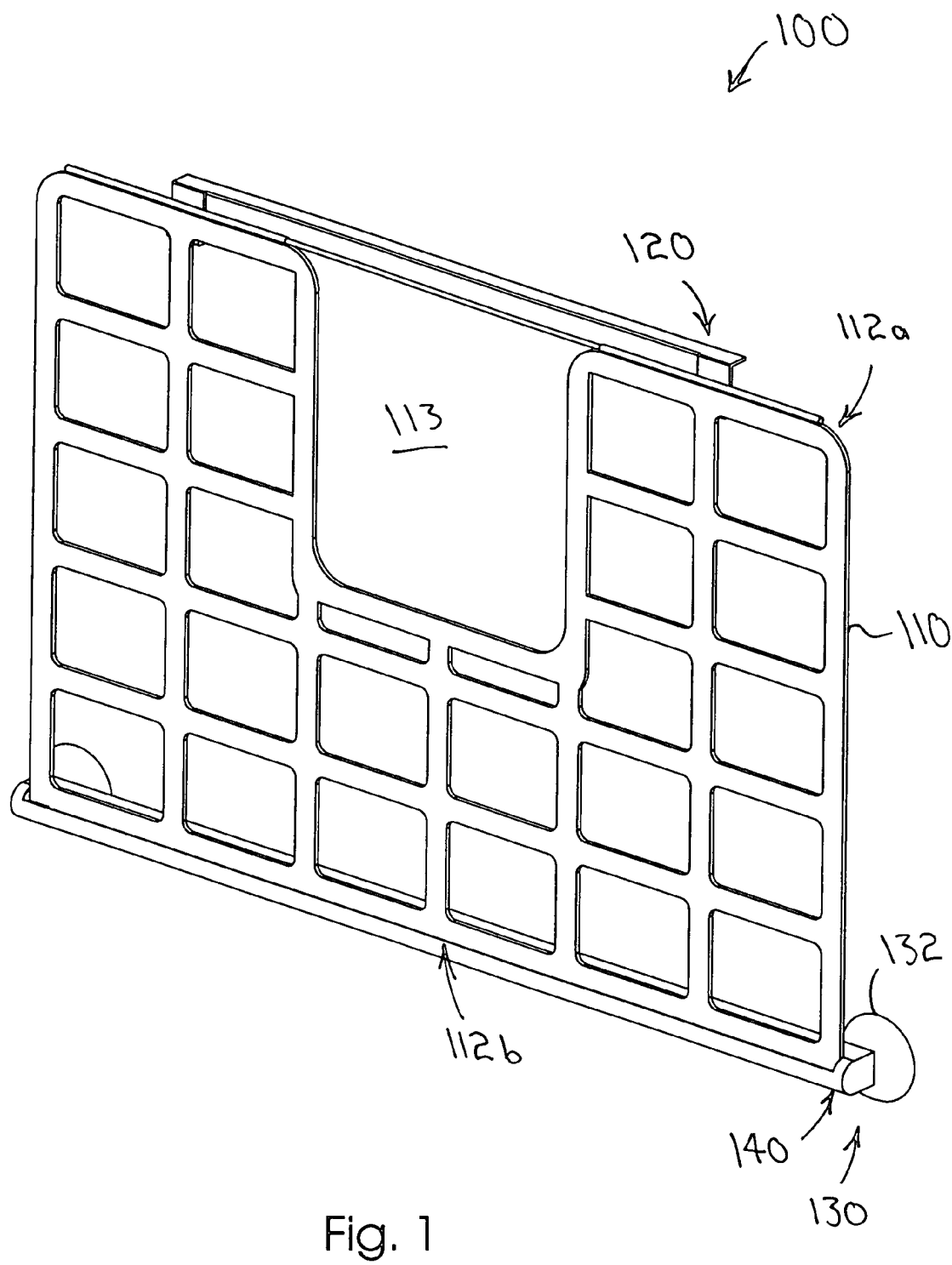
FIG. 1 is a perspective view of a vehicle restraint device according to a preferred embodiment of the present invention.

A window restraint device 100 according to the present invention will now be described in detail with reference to FIGS. 1 through 9 of the accompanying drawings. More particularly, a window restraint device 100 according to the current invention is for use with an automobile door frame 10 having upper and lower portions 12, 14 and defining an opening 15 therebetween and having a window 16 selectively positioned in the opening 15.

The window restraint device 100 includes a screen 110 having upper and lower ends 112a, 112b. The screen 110 may be constructed of nylon, metal wire, rubber, and/or another material, and the screen 110 may include a screen opening 113 sized to allow a dog's head but not the dog's body to pass therethrough, as shown in FIG. 1.

Figure 3:
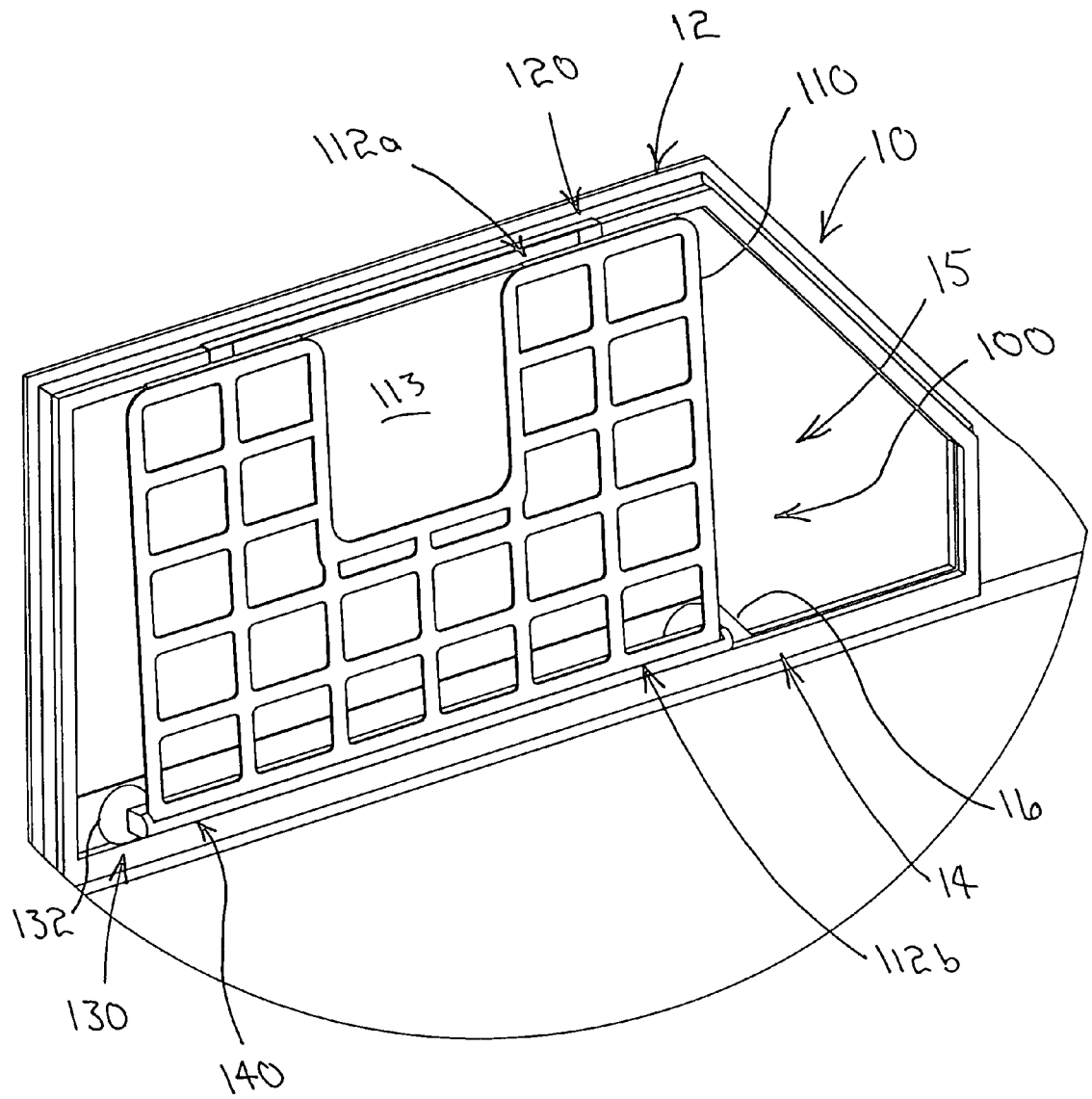
FIG. 3 is a perspective view of the vehicle restraint device as in FIG. 1 installed on a vehicle door frame.
Figure 4A:
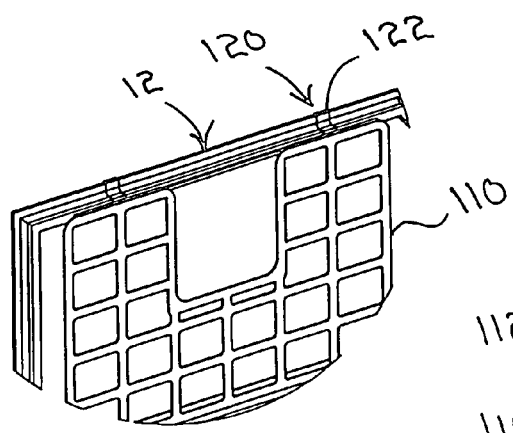
FIG. 4a is a fragmentary view of the restraint device attached to a vehicle door frame with clips.
Figure 4B:
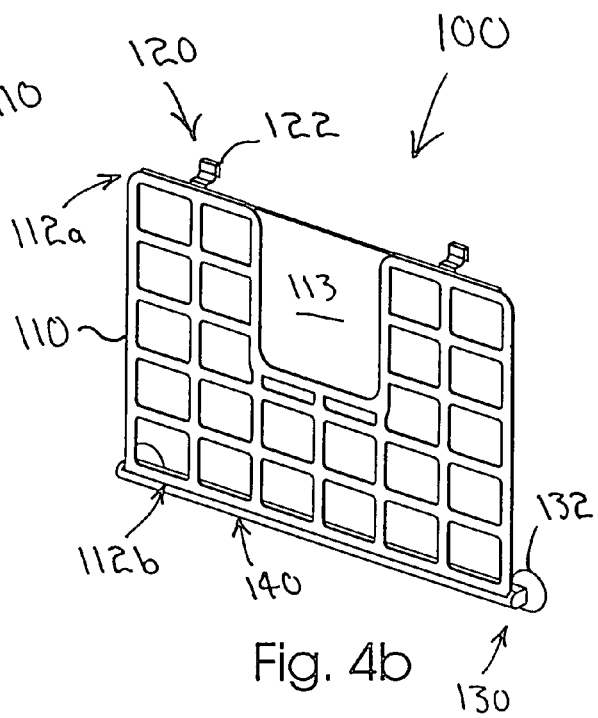
FIG. 4b is a perspective view of the restraint device as in FIG. 4a removed from the vehicle door frame.
Figure 4C:
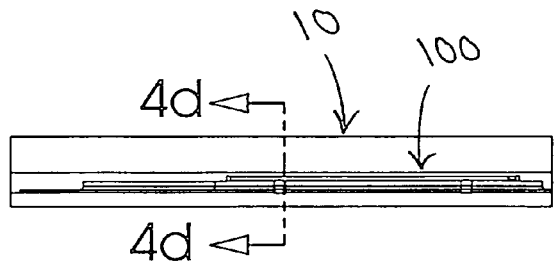
FIG. 4c is a top view of the restraint device as in FIG. 4b.
Figure 4D:
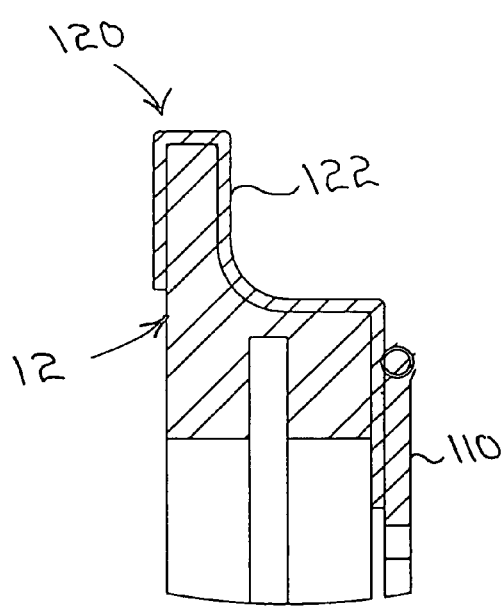
FIG. 4d is a sectional view of the restraint device taken along line 4d-4d of FIG. 4c.
Figure 6A:
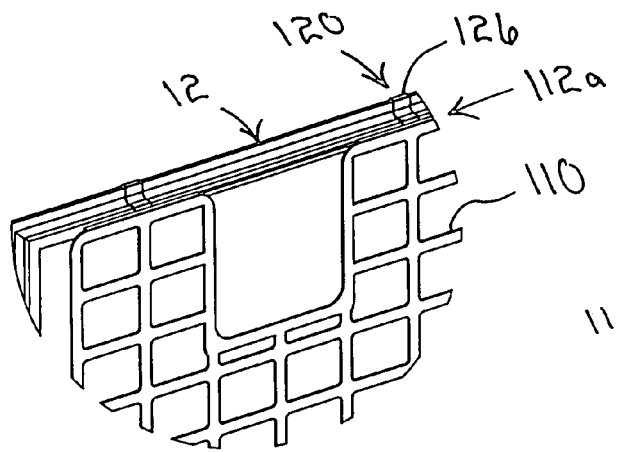
FIG. 6a is a fragmentary view of the restraint device attached to a vehicle door frame with brackets.
Figure 6B:
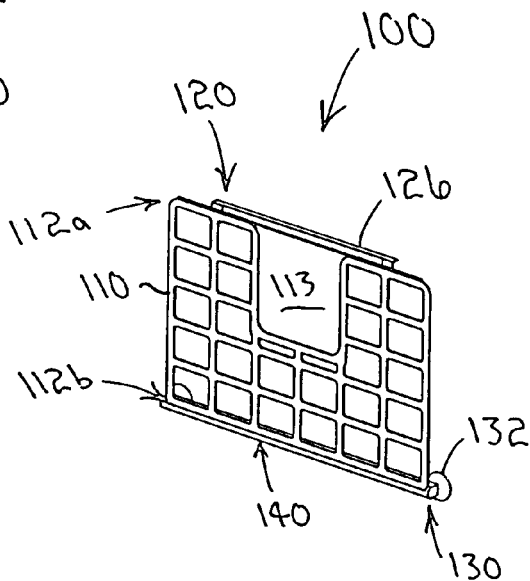
FIG. 6b is a perspective view of the restraint device as in FIG. 6a removed from the vehicle door frame.
Figure 6C:
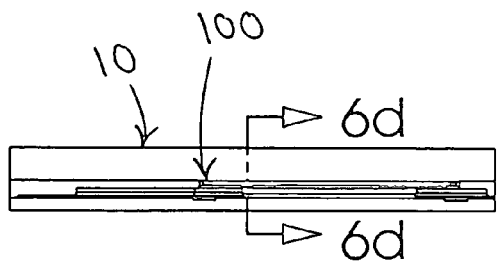
FIG. 6c is a top view of the restraint device as in FIG. 6b.
Figure 6D:
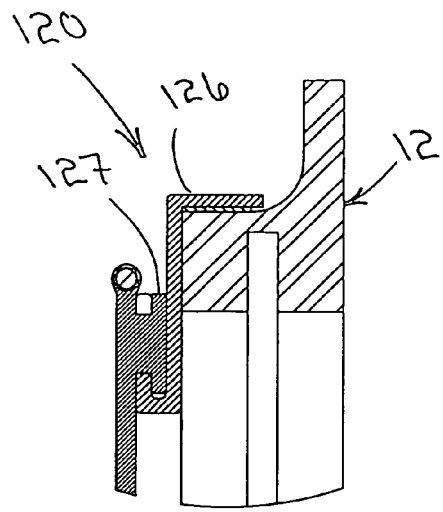
FIG. 6d is a sectional view of the restraint device taken along line 6d-6d of FIG. 6c.
Figure 7A:
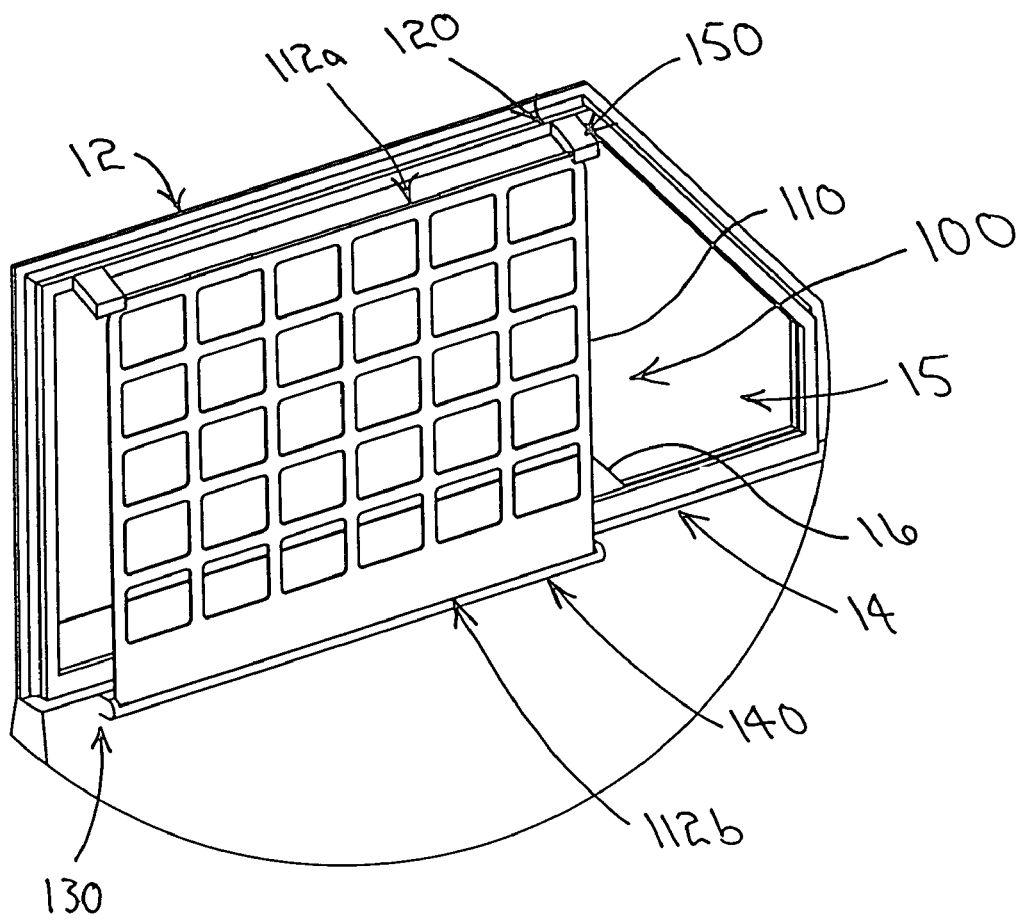
FIG. 7a is a perspective view of a restraint device according to another embodiment of the present invention having a remote release device.
Figure 7B:
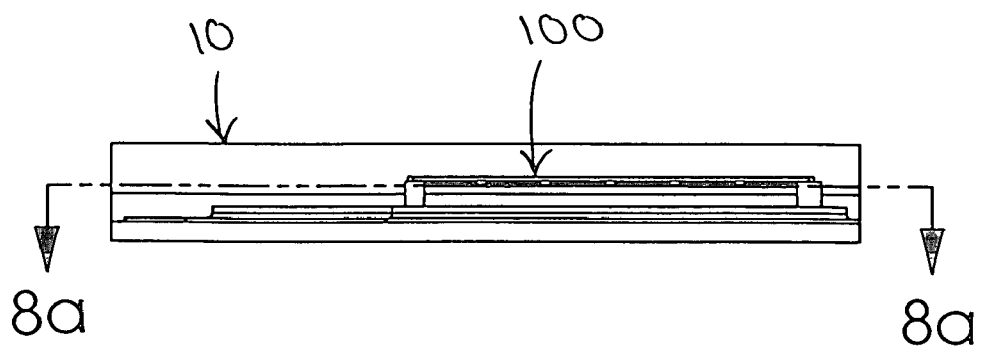

The window restraint device 100 includes means for attaching the screen upper end 112a to the upper portion 12 of the automobile door frame 10. More particularly, an upper attachment device 120 is operatively coupled to the screen upper end 112a for coupling the screen upper end 112a to the upper portion 12 of the automobile door frame 10 (FIG. 3). In the embodiment shown in FIGS. 4a through 4d, the upper attachment device 120 includes a clip 122 complementary to the door frame upper portion 12 for selectively sandwiching at least a part of the door frame upper portion 12. In the embodiment shown in FIGS. 5a through 5d, the upper attachment device 120 includes a strap 124 for encircling at least a part of the door frame upper portion 12. The strap 124 includes first and second ends 124a, 124b and means 125 for coupling the first and second ends 124a, 124b, such as hook and loop fasteners, snaps, laces, magnets, etc. In the embodiment shown in FIGS. 6a through 6d, the upper attachment device 120 includes a bracket 126 for attachment to the door frame upper portion 12 and a fastener 127 having a configuration complementary to the bracket 126 for selectively coupling the bracket 126 and the fastener 127. Importantly, in all of the embodiments shown and described herein, the upper attachment device 120 allows the window 16 to completely cover the opening 15 while the upper attachment device 120 couples the screen upper end 112a to the upper portion 12 of the automobile door frame 10. In other words, the upper attachment device 120 does not restrict the window 16 from closing. In addition, the upper attachment device 120 does not restrict the window 16 from uncovering the opening 15 while the upper attachment device 120 couples the screen upper end 112a to the upper portion 12 of the automobile door frame 10. In other words, the upper attachment device 120 does not restrict the window 16 from opening.

The window restraint device 100 further includes means for attaching the screen lower end 112b to either the lower portion 14 of the automobile door frame 10 or the window 16. More particularly, a lower attachment device 130 is operatively coupled to the screen lower end 112b for preferably coupling the screen lower end 112b to the window 16. Though various couplers may be used, the lower attachment device 130 preferably includes a suction device 132 for selectively coupling the screen lower end 112b to the window 16, as shown throughout the accompanying drawings (FIGS. 3, 4b, 5b, and 6b). Importantly, the lower attachment device 130 allows the window 16 to completely cover the opening 15 while the lower attachment device 130 couples the screen lower end 112b to the window 16. In other words, the lower attachment device 130 does not restrict the window 16 from closing. In addition, the lower attachment device 130 allows the window 16 to uncover a majority of the opening 15 while the lower attachment device 130 couples the screen lower end 112b to the window 16. In other words, the lower attachment device 130 does not restrict the window 16 from opening a majority of the way.

Figure 2A:
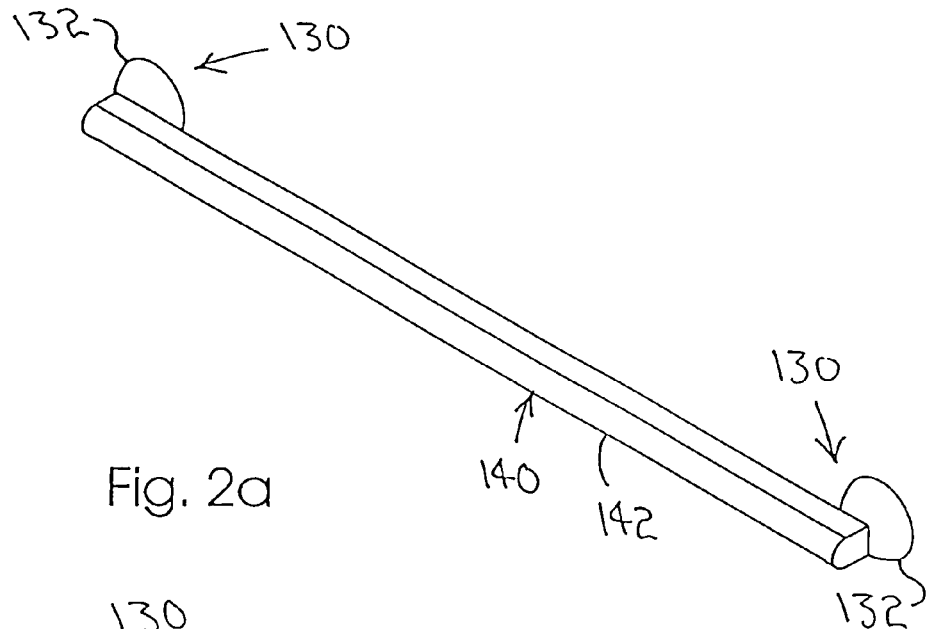
FIG. 2a is a perspective view of a height adjustment reel as in FIG. 1.
Figure 2B:
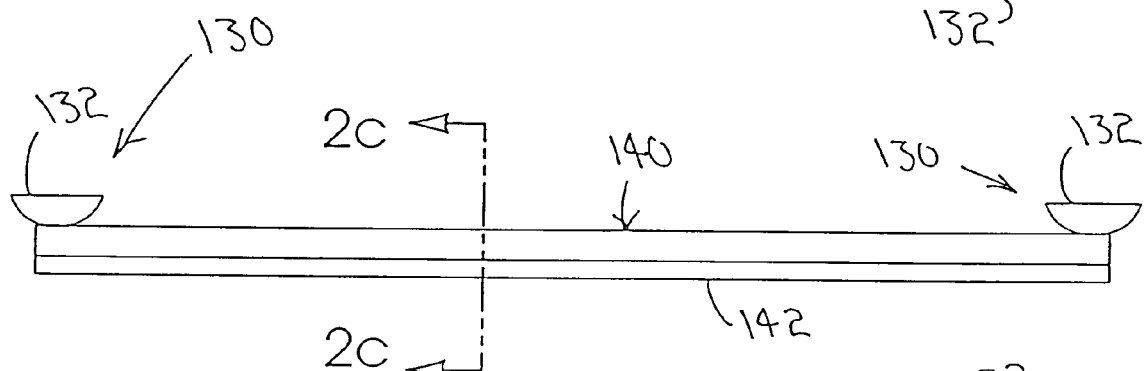
Figure 2C:
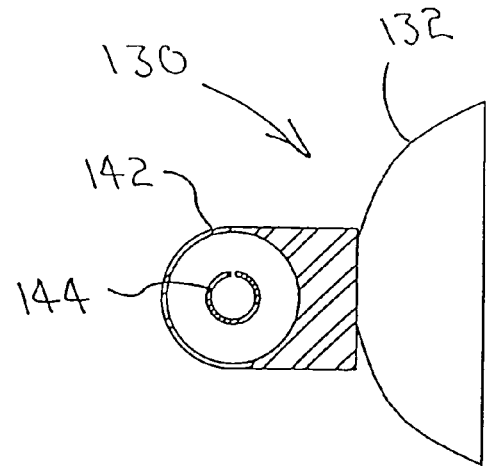
FIG. 2c is a sectional view of the height adjustment reel taken along line 2c-2c of FIG. 2b.

A height-adjustment reel 140 is in communication with the screen 110 for maintaining a predetermined amount of tension between the screen upper and lower ends 112a, 112b (FIG. 1). This allows a screen 110 to be used with door frames 10 having openings 15 of different sizes without having excess slack in the screen 110, and this allows the screen 110 to function while a window 16 is at various positions in an opening 15 without having excess slack in the screen 110. The height-adjustment reel 140 may include an outer housing 142 and a spring-loaded inner rod 144 located inside the outer housing 142, as shown in FIG. 2c. The inner rod 144 may be attached to the screen upper end 112a or the screen lower end 112b.

Figure 8A:
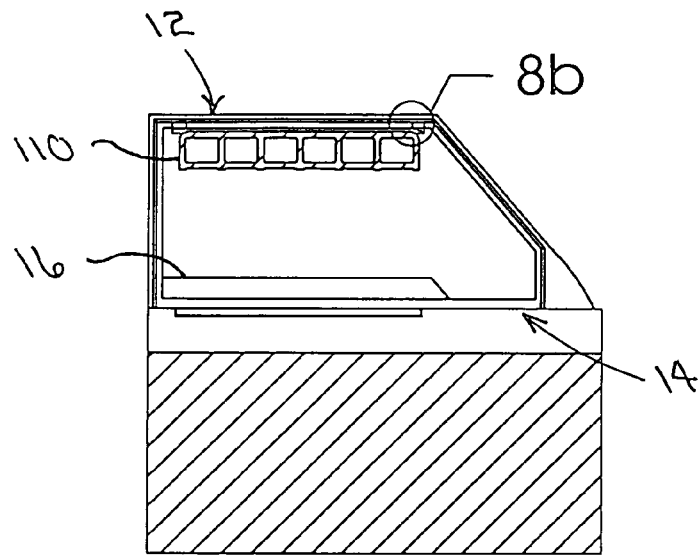
FIG. 8a is a sectional view of the restraint device taken along line 8a-8a of FIG. 7b.
Figures 8B, 8C:
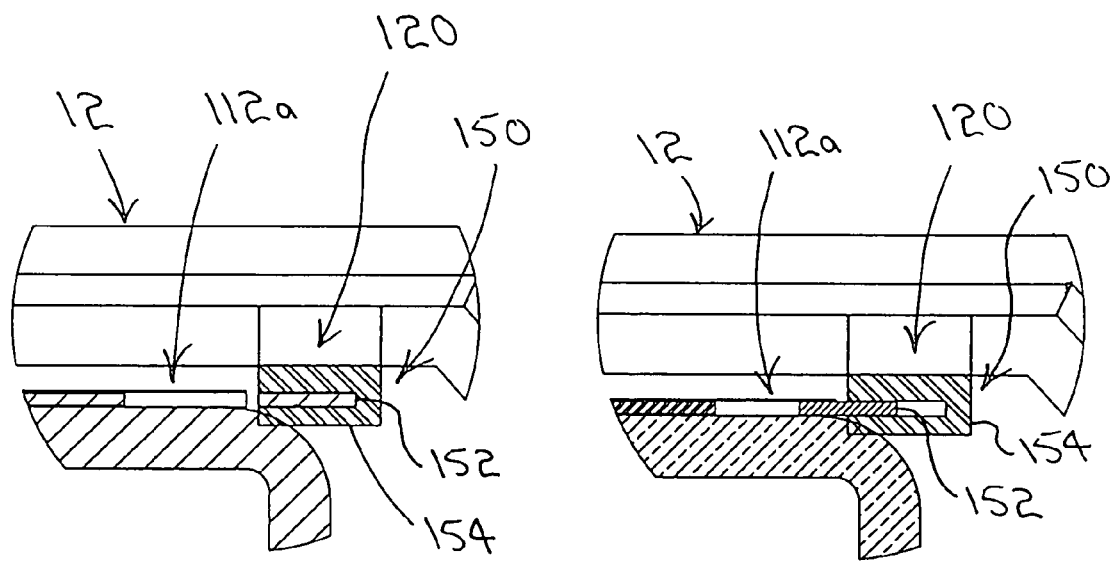
FIG. 8b is an isolated view on an enlarged scale of the portion of FIG. 8a denoted as 8b with a pin at a retracted configuration.
FIG. 8c is an isolated view as in FIG. 8b with the pin at an actuated configuration.

As shown in FIGS. 7a through 8c, either the upper attachment device 120 or the lower attachment device 130 may include a remotely operated release mechanism 150 for selectively uncoupling a respective end of the screen 110 to allow passage through the door frame opening 115. The remotely operated mechanism 150 may include a pin 152 actuated by a solenoid 154 (FIGS. 8b and 8c).

Figure 9:
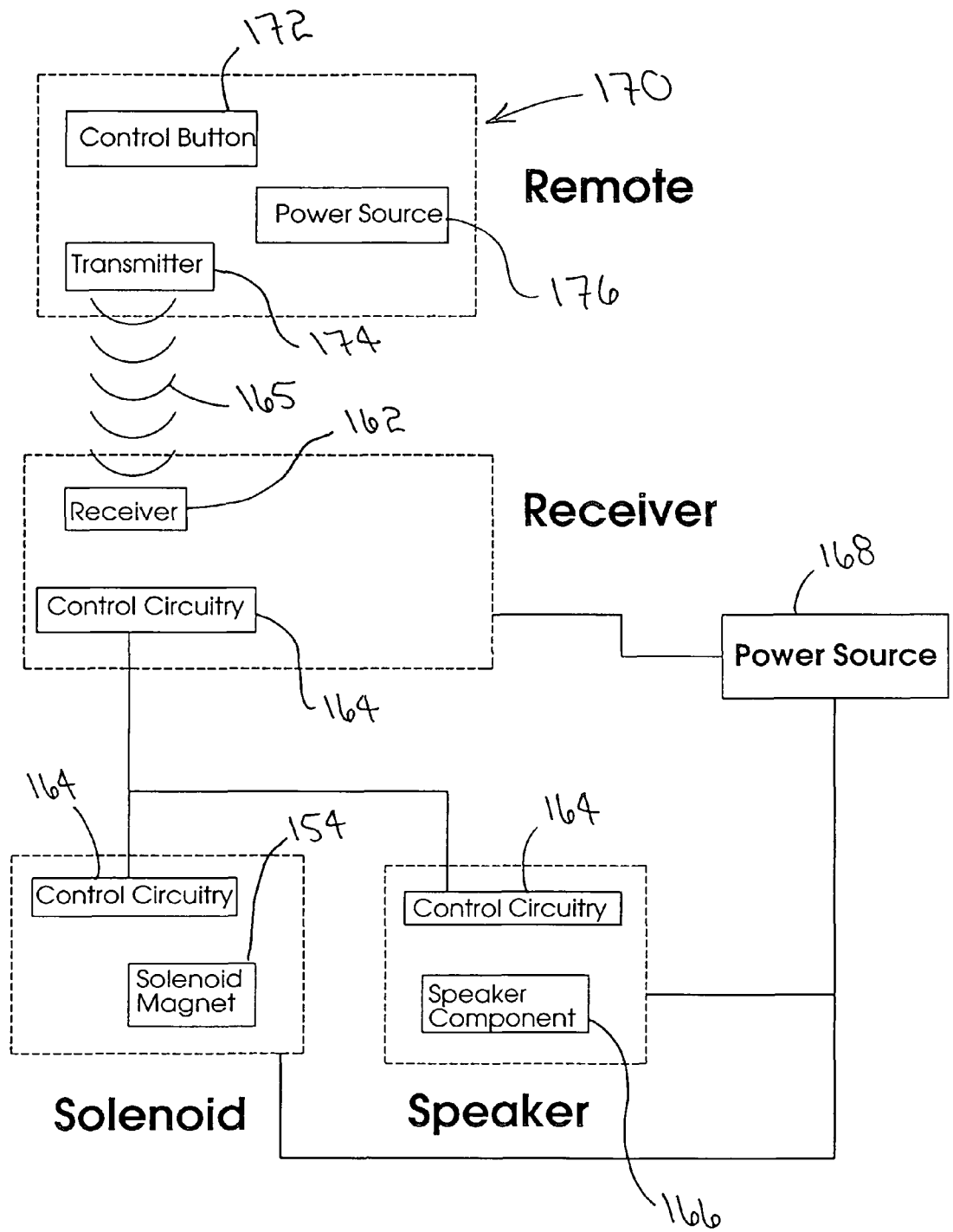
FIG. 9 is a block diagram showing the components of the remote release mechanism.

FIG. 9 shows that a receiver 162 and control circuitry 164 may be in data communication with the solenoid 154 for selectively actuating the solenoid 154 to move the pin 152 upon receipt of a predetermined signal 165. An audible alarm 166 may be in data communication with the receiver 162 for activation when the receiver 162 receives the predetermined signal 165. One or more power source 168 (e.g., a battery) may power the receiver 162, the solenoid 154, and the alarm 166. A remote control device 170 may be separate from the receiver 162. The remote control device 170 may have an input device 172 in data communication with a transmitter 174 for selectively actuating the transmitter 174 to transmit the predetermined signal 165 to the receiver 162. A power source 176 (e.g., a battery) powers the transmitter 174.

In use, the upper attachment device 120 couples the screen upper end 112a to the upper portion 12 of the automobile frame 10 as described above and shown in FIGS. 3, 4a, 4d, 5a, 5d, 6a, 6d, 7a, 8b, and 8c. The lower attachment device 130 couples the screen lower end 112b to the window 16 as described above and shown in FIG. 3 or to the lower portion 14 of the automobile frame 10 as described above and shown in FIG. 7a. The height-adjustment reel 140 may remove slack from the screen 110 as described above so that the window restraint device 100 can be used with door frames 10 having openings 15 of different sizes and with a window 16 that is at various positions in an opening 15.

The remotely operated release mechanism 150 may be utilized to allow passage through the door frame opening 115. This may be particularly useful for canine law enforcement purposes, though it is clearly not limited to such. To utilize the remotely operated release mechanism 150, a user may operate the input device 172 on the remote control device 170. The transmitter 174 in the remote control device 170 may then transmit the predetermined signal 165 to the receiver 162 in data communication with the control circuitry 164. When the control circuitry 164 receives the signal 165, it may actuate the solenoid 154, causing the pin 152 to move from an extended configuration (FIG. 8c) to a retracted configuration (FIG. 8b). When the pin 152 is at the retracted configuration, gravity may lower the screen upper end 112a, the height-adjustment reel 140 may lower the screen upper end 112a, the height-adjustment reel 140 may raise the screen lower end 112b, or the screen 110 may simply allow passage therethrough, depending on whether the height-adjustment reel 140 is included, and if so, whether the rod 144 is attached to the screen upper or lower end 112a, 112b.

It is understood that while certain forms of this invention have been illustrated and described, it is not limited thereto except insofar as such limitations are included in the following claims and allowable functional equivalents thereof.

What is claimed is as follows:

1. A window restraint device for use with an automobile door frame having upper and lower portions and defining an opening therebetween and having a retractable window selectively positioned in the opening and capable of moving upwardly into a closed position and downwardly into an open position, said device comprising:
   a screen having an upper end and a lower end;
   an upper attachment device operatively coupled to said screen upper end for coupling said screen upper end to the upper portion of the automobile door frame whereby the window is permitted to move into the closed position as well as the open position without restriction from the upper attachment device; and
   a lower attachment device operatively coupled to said screen lower end for coupling said screen lower end to the window whereby the window is permitted to move into the closed position as well as substantially into the open position without restriction from the lower attachment device.

2. The window restraint device of claim 1, wherein said lower attachment device includes a suction device for selectively coupling said screen lower end to the window.

3. The window restraint device of claim 2, further comprising a height-adjustment reel in communication with said screen for maintaining a predetermined amount of tension between said screen upper and lower ends.

4. The window restraint device of claim 3, wherein: the height-adjustment reel includes an outer housing and a spring-loaded inner rod located inside said outer housing; and one of said screen upper end and said screen lower end is attached to said inner rod.

5. The window restraint device of claim 2, wherein: said lower attachment device allows the window to completely cover the opening while said lower attachment device couples said screen lower end to the window; and said lower attachment device allows the window to uncover a majority of the opening while said lower attachment device couples said screen lower end to the window.

6. The window restraint device of claim 1, wherein: said upper attachment device allows the window to completely cover the opening while said upper attachment device couples said screen upper end to the upper portion of the automobile door frame; and said upper attachment device does not restrict the window from uncovering the opening while said upper attachment device couples said screen upper end to the upper portion of the automobile door frame.

7. The window restraint device of claim 1, wherein said upper attachment device includes a clip complementary to the door frame upper portion for selectively sandwiching at least a part of the door frame upper portion.

8. The window restraint device of claim 1, wherein: said upper attachment device includes a strap for encircling at least a part of the door frame upper portion; and said strap includes first and second ends and means for coupling said first and second ends.

9. The window restraint device of claim 1, wherein said upper attachment device includes: a bracket for attachment to the door frame upper portion; and a fastener having a configuration complementary to said bracket for selectively coupling said bracket and said fastener.

10. The window restraint device of claim 1, wherein said screen includes a screen opening sized to allow a dog's head but not the dog's body to pass therethrough.

11. The window restraint device of claim 1, wherein one of the upper attachment device and the lower attachment device includes a remotely operated release mechanism for selectively uncoupling a respective end of said screen to allow passage through the door frame opening.

12. The window restraint device of claim 11, wherein said remotely operated release mechanism includes a pin actuated by a solenoid.

13. The window restraint device of claim 12, further comprising: a receiver and control circuitry in data communication with said solenoid for selectively actuating said solenoid to move said pin upon receipt of a predetermined signal; and a remote control device separate from said receiver and having an input device in data communication with a transmitter for selectively actuating said transmitter to transmit said predetermined signal to said receiver.

14. The window restraint device of claim 13, further comprising an audible alarm in data communication with said receiver for activation when said receiver receives said predetermined signal from said transmitter.

15. A window restraint device for use with an automobile door frame having upper and lower portions and defining an opening therebetween and having a retractable window selectively positioned in the opening and capable of moving upwardly into a closed position and downwardly into an open position, said device comprising:
   a screen having an upper end and a lower end;
   means for alt aching said screen upper end to the upper portion of the automobile door frame whereby the window is permitted to move into the closed position as well as the open position without restriction from the screen upper end attaching means; and
   means for attaching said screen lower end to an element selected from the group consisting of the lower portion of the automobile door frame and the window, whereby the window is permitted to move into the closed position as well as substantially into the open position without restriction from the screen lower end attaching means.

16. The window restraint device of claim 15, wherein said means for attaching said screen lower side do not restrict the window from completely covering the opening.

17. The window restraint device of claim 16, further comprising a height-adjustment reel in communication with said screen for maintaining a predetermined amount of tension between said screen upper and lower ends.

18. The window restraint device of claim 17, wherein: the height-adjustment reel includes an outer housing and a spring-loaded inner rod located inside said outer housing; and one of said screen upper end and said screen lower end is attached to said inner rod.

19. The window restraint device of claim 17, further comprising a remotely operated release mechanism for selectively uncoupling a respective end of said screen to allow passage through the door frame opening.

20. The window restraint device of claim 19, wherein: said remotely operated release mechanism includes a pin actuated by a solenoid; a receiver and control circuitry are in data communication with said solenoid for selectively actuating said solenoid to move said pin upon receipt of a predetermined signal; a remote control device is separate from said receiver and has an input device in data communication with a transmitter for selectively actuating said transmitter to transmit said predetermined signal to said receiver; and an audible alarm is in data communication with said receiver for activation when said receiver receives said predetermined signal from said transmitter.

* * * * *